Feb. 12, 1929.
P. F. GARDNER ET AL
1,701,999
HEATING SYSTEM FOR AUTOMOBILES
Filed Nov. 28, 1923
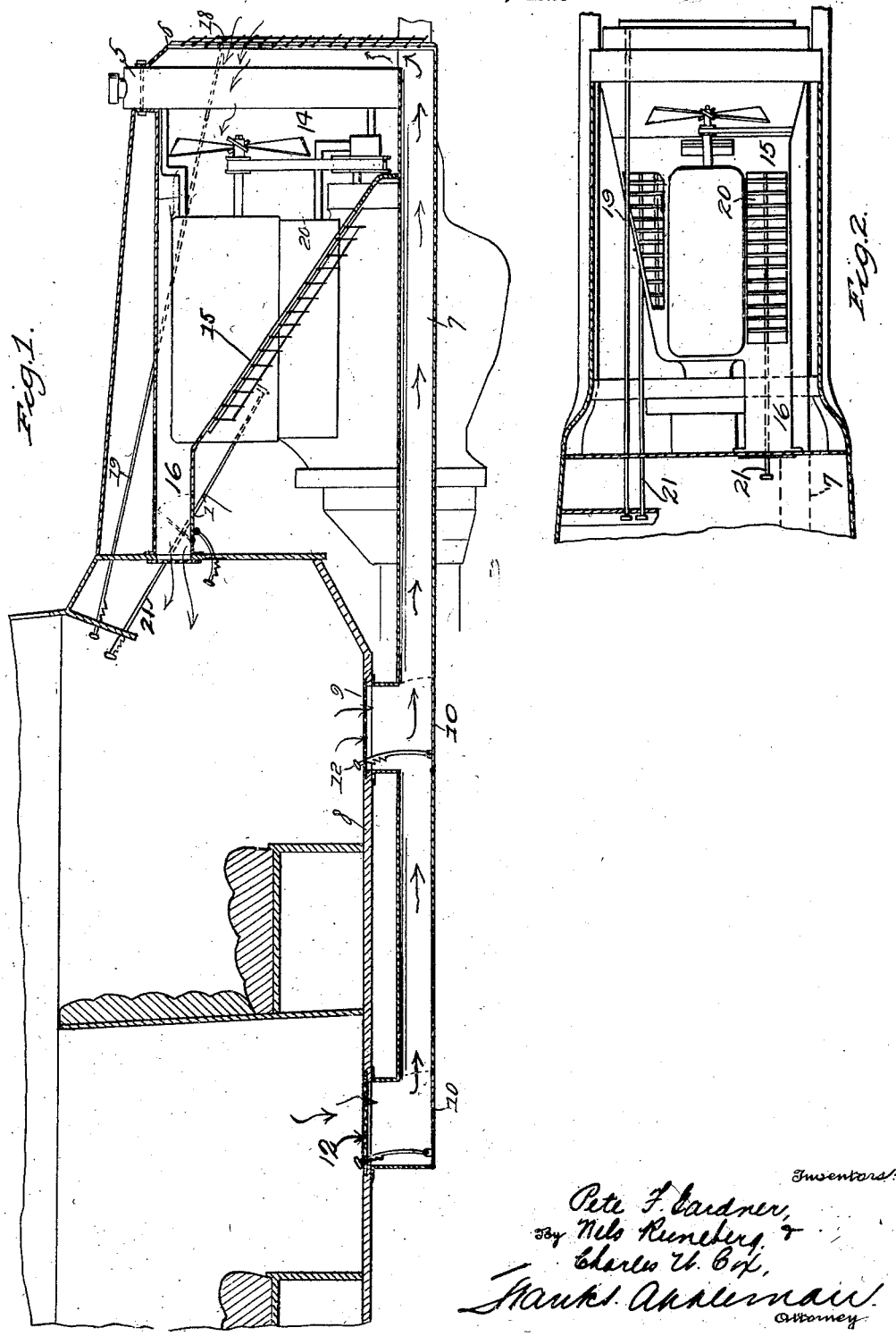

Patented Feb. 12, 1929.

1,701,999

UNITED STATES PATENT OFFICE.

PETE F. GARDNER, NELS RUNEBERG, AND CHARLES W. COX, OF SIOUX FALLS, SOUTH DAKOTA.

HEATING SYSTEM FOR AUTOMOBILES.

Application filed November 28, 1923. Serial No. 677,531.

This invention relates to automobile construction, and particularly to means for utilizing the heat which is given off from the motor for the purpose of heating the interior of the automobile body, the said invention being designed for the purpose of directing the heat by way of conduits or flues to and from the interior of the body in order that a circulation of air may be maintained.

It is furthermore an object of this invention to provide means whereby air at atmospheric temperature may be circulated to effect the cooling of the automobile body under certain conditions of use, as in summer time when the automobile is running.

It is a further object of this invention to provide a novel construction for embracing or partially housing the motor of an automobile in order that the circulation of air to the space around the motor may be controlled, thus making it possible for an operator to so adjust the mechanism as to admit air to the space around the motor for the purpose of cooling it.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view of a hood and a part of the body of an automobile showing the housing and ducts for utilizing the heated air; and Figure 2 illustrates a top plan view of a fragment thereof.

In these drawings, 5 denotes a radiator of conventional type having a shield 6 applied to its front, and this shield is spaced from the radiator to form a duct that communicates with a pipe 7 extending rearwardly under the body 8 and communicating with the interior of the body at such convenient locations as may be desirable, through one or more registers 9.

The pipe 7 is provided with hinged sections such as 10 which constitute what might be termed valves, and these hinged sections are pivotally connected to operating handles 12 that may be adjusted to lift the valves to control the passage through the pipe 7, and to admit air to the circulating system without taking same from the interior of the vehicle, as would be the case when the valves are in horizontal position as shown by Fig. 1.

The breast plates 15 rearward of the radiator 5 incline upward to join the way 16 which leads to the interior of the automobile body, and said breast plates can be positioned on opposite sides of the engine, as indicated by Fig. 2.

The shield 6 also has a damper or shutter 18 to which a rod 19 is operatively connected, the said rod running rearwardly to the interior of the automobile body where it will be within convenient reach of an operator for the purpose of permitting him to vary the opening through the shield.

The breast plate also has a shutter 20 and there is an operating rod 21 connected to it so that it may likewise be controlled for the purpose of regulating the passage of air as the weather conditions require.

It will be apparent from an inspection of Fig. 1 that air entering through the shield will be directed to the radiator and its temperature will be raised, and if the shutter 20 is closed nearly all of the air that has entered the space between the breast plate and the radiator will circulate through the pipe 16 and find its way to the interior of the automobile body, but if the shutter 20 is open it will permit a circulation of air around the motor and to and from the automobile body.

We claim:

In an automobile, an internal combustion motor, a radiator connected in operative relation thereto, an apertured shield at the front of the radiator and spaced therefrom, a damper for controlling the apertures of the shield, a conduit extending rearwardly below the radiator and communicating with the interior of the body of the automobile, dampers for the conduit that communicates with a space between the shield and radiator, a breast plate back of the radiator having an aperture therethrough, a damper controlling the said aperture, a second conduit which extends rearwardly from the breast plate into the automobile body, a damper for said conduit, and operating means for the dampers which extend from the dampers to the interior of the automobile body.

PETE F. GARDNER.
NELS RUNEBERG.
CHARLES W. COX.